3,840,624
METHOD OF MANUFACTURING A FERRITE MAGNET

Terence Leslie Tombs, Warwick, England, assignor to Joseph Lucas (Industries) Limited, Birmingham, England
No Drawing. Filed Jan. 26, 1972, Ser. No. 221,031
Claims priority, application Great Britain, Jan. 26, 1971, 3,146/71
Int. Cl. H01f 13/00
U.S. Cl. 264—22                 17 Claims

ABSTRACT OF THE DISCLOSURE

A method of manufacturing a ferrite magnet having a reduced tendency to form cracks during processing comprising mixing a powdered ferrite magnet material with a fibrous material, pressing the mixture in a magnetic field to produce a compact of the desired shape, demagnetising the compact, and sintering the compact is disclosed. The fibrous material may be of a type which remains in the magnet after processing or of a type which decomposes upon sintering.

---

This invention relates to a method of manufacturing a ferrite magnet.

It is known to manufacture a ferrite magnet by sintering a starting material to form a ferrite magnet material, pressing the ferrite magnet material in a magnetic field to the shape of the required ferrite magnet and then, after subsequent de-magnetisation, sintering the ferrite magnet material to produce the required ferrite magnet.

According to the invention, a method of manufacturing a ferrite magnet comprises the step of starting with a ferrite magnet material and, prior to pressing in a magnetic field, mixing the ferrite magnet material with a fibrous material.

Preferably, the fibrous material is non-metallic and is substantially uniformly dispersed in the ferrite magnet material.

Preferably, said fibrous material is refractory.

Conveniently, the ferrite magnet material has a strontium ferrite base, or alternatively has a barium ferrite or lead ferrite base.

In one example of the invention, 83% ferric oxide, 12.8% strontium carbonate, 1.77% lead monoxide, 1% calcium fluoride, 1% alumina and ½% strontium phosphate, all in powder form, where mixed to produce a starting material and the starting material was calcined at 1260° C. for one hour to produce a ferrite magnet material. The ferrite magnet material was then ball milled in water to produce a slurry whose mean Fisher Sub-Sieve Particle Size measurement was 0.90 microns. The specific gravity of the slurry was then adjusted to a value of 2.3 and 0.5% by weight of clean, washed alumino-silicate fibres, such as Morgans Triton Kaowool grade 7, or Fiberfrax as sold by Carborundum Limited, was added to the slurry. Typically the length to diameter ratio of the fibres used was between 1000 and 5000 to 1 and the diameter of the fibres was 3 microns. The fibres were thoroughly mixed into the slurry which was then filter pressed in a magnetic field to produce a green compact having the shape of the required ferrite magnet. The green compact was de-energised and then sintered to produce the required sintered magnet which exhibited the following properties:

| Sintering temperature | Density | Remanence | Intrinsic coercivity |
|---|---|---|---|
| 1,265° C | 4.89 gm./cc | 3,739 gauss | 3,320 oersted. |

It was found that, by using the above method, the formation of cracks both in the green compact and in the finished magnet and also the tendency for the cracks in the green compact to propagate on sintering, were reduced by the addition of alumino-silicate fibres to the ferrite magnet material prior to pressing, as compared to a method wherein no such additives were included. Further, the strength of the green compact was found to be enhanced by the addition of the fibrous material. Thus, using the Diametral Compression Test (see Materials Research and Standards, April 1963, volume 3, part 4, pages 283–289) the green compact obtained in the above example exhibited after de-magnetisation a strength of 394 kN/m.$^2$ (kilo-newtons per square meter) whereas a similar green compact, but without the fibrous additive, exhibited, after de-magnetisation, a strength of 285 kN/m.$^2$. The same non-fibre containing compact gave sintering to 1265° C., a magnet having a remanence of 3900 gauss and an intrinsic coercivity 3450 oersted.

In a second example of the invention, the starting material was a mixture of 84% ferric oxide, 12.9% strontium carbonate, 1.7% lead monoxide, 1% calcium fluoride and ½% strontium phosphate, all in powder form, the mixture being calcined and then ball milled in water to produce a slurry, as in the previous example. The specific gravity of the slurry was then adjusted to 2.3 and ½% of alumino-silicate fibres were mixed into the slurry which was subsequently filter pressed in a magnetic field to produce a green compact, the green compact, after de-magnetisation being sintered to produce the required ferrite magnet. The magnet thus produced exhibited the following properties:

| Sintering temperature | Density | Remanence | Intrinsic coercivity |
|---|---|---|---|
| 1,260° C | 4.96 gm./cc | 3.59 kgauss | 3.77 koersted. |
| 1,270° C | 4.95 gm./cc | 3.68 kgauss | 3.60 koersted. |

Again, it was found that the formation of cracks both in the green compact and in the finished magnet and also the tendency for the cracks in the green compact to propagate on sintering were reduced by the addition of alumino-silicate fibres to the ferrite magnet material prior to pressing, as compared to a method wherein no such additives were included.

In a third example a starting material was made up from a similar mixture to that used in the first example, but excluding the strontium phosphate. The mixture was then calcined at 1260° C. for 1 hour and was then ball milled in water to produce a slurry, having a mean Fisher Sub-Sieve Particle Size measurement of 0.80 microns. The specific gravity of the slurry was adjusted to a value of 2.3 and the slurry was then divided into four samples. With three of these samples was mixed 0.25%, 0.5% and 1% by weight respectively of alumino silicate fibres, the fourth sample remaining free of the fibres. Each of the samples was then filter pressed in a magnetic field to produce a green compact and after de-magnetisation, the physical strength of each green compact was measured by the Diametral Compression Test. The results of these measurements are given below:

| Percentage by weight of fibres: | Green compact strength (kN/m.$^2$) |
|---|---|
| Nil | 285 |
| 0.25 | 314 |
| 0.5 | 394 |
| 1.0 | 442 |

Each of the green compacts containing fibres were found to be relatively free of cracks and also produced substantially crack-free magnets. On the other hand, a large number of cracks were found to have been formed in the green compact without fibres, which cracks showed a tendency to propagate on sintering.

In a fourth example, a starting material was again made up from a similar mixture to that used in the first example, but now excluding both the strontium phosphate and the alumina. The mixture was calcined and then ball milled in water, as in the previous example, to produce a slurry and the specific gravity of the slurry was adjusted to 2.3. The slurry was then divided up into four samples and with three of the samples was mixed 0.25%, 0.5% and 1.0% by weight respectively of alumina silicate fibres, the fourth sample being kept free of fibres. Each sample was filter pressed in a magnetic field to produce a green compact which, following de-magnetisation, was sintered at 1150° C. to produce a ferrite magnet. The magnets thus obtained exhibited the following properties:

| Percentage fibres | Remanence | Intrinsic coercivity |
| --- | --- | --- |
| Nil | 3.77 kgauss | 3.2 koersted. |
| 0.25 | 3.73 kgauss | 3.3 koersted. |
| 0.5 | 3.63 kgauss | 3.3 koersted. |
| 1.0 | 3.46 kgauss | 3.6 koersted. |

Once again, it was found that the tendency for cracks to form both in the green compact and in the finished magnet was considerably reduced with the samples containing fibres. In adition, the green compacts formed from the fibre-containing samples were found to exhibit improved strength properties as compared with the sample without fibres.

In the case of refractory fibres, such as the alumino silicate of the above examples, it was found to be desirable to use fibres having a mean diameter of between 0.5 and 10 microns and a length to diameter ratio in excess of 10:1. Further it was found to be desirable to mix between 0.25% and 5% by volume of the refractory fibres with the slurry of the ferrite magnet material. More preferably, between 0.5% and 2% by volume of the fibres were mixed with the slurry and most preferably 1.0% by volume.

In addition to refractory fibres, it was found that successful results could be achieved by using acicular hematite or fibres of a material which would be decomposed when the ferrite magnet material was sintered to produce a magnet. With decomposable fibres, it was found to be necessary to ensure that the decomposition products of the fibres were either gaseous or else produced an ash, which preferably constituted less than 0.1% by weight of the resultant magnet. Further it was found to be necessary to ensure that the decomposition temperature of the fibres was at least 200° C. below the temperature at which the ferrite magnet material began to sinter. Preferably, the decomposable fibres were arranged to have a diameter of up to 100 microns and a length to diameter ratio in excess of 10:1. In addition, it was found to be desirable with decomposable fibres to mix between 0.25% and 30% by volume of the fibres with the ferrite magnet material. More preferably, the amount of fibres mixed with the ferite magnet material was arranged to be between 1% and 10% by volume or most preferably between 2% and 5% by volume.

Thus in a fifth example, the slurry obtained in the first example was divided into three samples and with two of the samples were mixed 0.5% and 5% by weight respectively of cotton cellulose fibres, the mixing operation being effected in a vibratory mixer to ensure uniform dispersion of the fibres. The remaining sample was not provided with the fibre additive. Each of the samples was then filter pressed in a magnetic field to produce a green compact and after de-magnetisation, the strength of each green compact was measured by the Diametral Compression Test. The results of these measurements are given in the following table, which also lists the magnetic properties of the magnets obtained by sintering the green compacts at 1240° C.:

| Percentage fibres | Remanence | Intrinsic coercivity | Green strength |
| --- | --- | --- | --- |
| Nil | 3.885 kgauss | 3.7 koersted | 156 kN/m.$^2$. |
| 0.5 | 3.85 kgauss | 3.5 koersted | 329 kN/m.$^2$. |
| 5 | 3.4 kgauss | 3.7 koersted | 550 kN/m.$^2$. |

The cotton cellulose fibres burnt off at between 300–400° C. during sintering of the green compacts into the magnets and, in addition to increasing the strength of their green compacts, reduced the tendency of cracks to form in the green compacts and in the subsequent magnets.

In a sixth example of the invention, a ferrite magnet material was produced in the same way as that described in the first example and after ball milling to produce a slurry was mixed with 5% by weight of acicular hematite, sold as HD 160 by Societe des Couleur de Provence, France, the fibres having a length to diameter ratio of between 5 and 15 to 1. The slurry was then filter pressed in a magnetic field to produce a green compact and the green compact, after subsequent de-magnetisation, was sintered to form a ferrite magnet. It was found that the magnet properties of the ferrite magnet produced were improved as compared to the previous examples in which the fibrous additive was alumino-silicate fibres. The magnetic properties of the magnet produced in the third example of the invention were as follows:

| Sintered temperature | Remanence | Intrinsic coercivity |
| --- | --- | --- |
| 1,270° C | 3.77 kgauss | 3.5 koersted. |
| 1,260° C | 3.69 kgauss | 3.85 koersted. |

However, it was found that the strength of the green compact was reduced as compared with the values obtained with other fibrous adidtives and, in this particular example, the strength was measured as 224 kN/m.$^2$. This strength value was only comparable with the values obtained without fibres, but, as with the other fibres tried, the tendency for cracks to form in the green compact and the final magnet was substantially reduced by the addition of the hematite.

It is to be appreciated that in this sixth example, the acicular hematite could be added to the ferrite magnet material directly after sintering of the starting material and before the ball milling of the ferrite material into a slurry.

Further, in all cases it was found to be desirable to use non-metallic fibres and to arrange that the fibres were substantially uniformly dispersed in the ferrite magnet material.

Finally, it is to be appreciated that although in the above examples the fibrous material is mixed with a ferrite magnet material having a strontium ferrite base, the fibrous material could alternatively be mixed with a ferrite magnet mateiral having a barium ferrite or a lead ferrite base.

I claim:

1. A method of manufacturing a ferrite magnet having a reduced tendency to form and propagate cracks in the green compact and in the finished magnet comprising,
   (a) mixing a powdered ferrite magnet material with a fibrous material;
   (b) pressing the mixture of powdered ferrite magnet material and fibrous material in a magnetic field to thereby produce a compact of the desired shape;
   (c) demagnetising said compact; and
   (d) sintering said compact.

2. A method as claimed in claim 1 wherein the fibrous material is non-metallic and is substantially uniformly dispersed in the ferrite magnet material.

3. A method as claimed in claim 1 wherein the fibrous material is a refractory.

4. A method as claimed in claim 3 wherein the mean diameter of the fibres is between 0.5 and 10 microns and the length to diameter ratio of the fibres is in excess of 10:1.

5. A methods as claimed in claim 3, wherein the mixture of the ferrite magnet material and the refractory fibres contains between 0.25% and 5% by volume of the fibres.

6. A method as claimed in claim 3 wherein the mixture of the ferrite magnet material and the refractory fibres contains between 0.5% and 2% by volume of the fibres.

7. A method as claimed in claim 3 wherein the mixture of the ferrite magnet material and the refractory fibres contains 1% by volume of the fibres.

8. A method as claimed in claim 3 wherein the fibrous material is alumino-silicate fibres.

9. A method as claimed in claim 1 wherein the fibrous material is acicular hematite.

10. A method as claimed in Claim 1 wherein the fibrous material decomposes during sintering of the mixture to produce the required ferrite magnet, the decomposition temperature of the fibrous material being at least 200° C. below the temperature at which sintering of said ferrite magnet material commences and the decomposition products of the fibrous material are in a form selected from the group consisting of gas, ash, and mixtures thereof.

11. A method as claimed in claim 10 wherein the mean diameter of the fibres is up to 100 microns and their length to diameter ratio is in excess of 10:1.

12. A method as claimed in claim 10 wherein the mixture of the ferrite material and the decomposable fibres contains between 0.25% and 30% by volume of the fibres.

13. A method as claimed in claim 1 wherein the mixture of the ferrite material and the decomposable fibres contains between 2% and 5% by volume of the fibres.

14. A method as claimed in claim 10 wherein the mixture of the ferrite material and the decomposable fibres contains between 2% and 5% by volume of the fibres.

15. A method as claimed in claim 1 wherein the ferrite magnetic material has a strontium ferrite base.

16. A method as claimed in claim 1 wherein the ferrite magnetic material has a lead ferrite base.

17. A method as claimed in claim 1 wherein the ferrite magnetic material has a barium ferrite base.

References Cited
UNITED STATES PATENTS

| | | | |
|---|---|---|---|
| 3,723,587 | 3/1973 | Iwase et al. | 264—61 |
| 3,607,608 | 9/1971 | Siefert | 264—Dig. 19 |

OTHER REFERENCES

W. L. Lachman et al., "Ceramic Fibers," October 1962, Chemical Engineering Progress, pp. 37–41.

ROBERT F. WHITE, Primary Examiner

J. R. HALL, Assistant Examiner

U.S. Cl. X.R.

264—60, 122